United States Patent
Paget et al.

(10) Patent No.: US 7,841,016 B2
(45) Date of Patent: Nov. 23, 2010

(54) LOCAL INJECTOR OF SPIN-POLARIZED ELECTRONS WITH SEMICONDUCTOR TIP UNDER LIGHT EXCITATION

(75) Inventors: Daniel Paget, Gif sur Yvette (FR); Jacques Peretti, Paris (FR); Alistair Rowe, Orsay (FR); Georges Lampel, Paris (FR); Bruno Gerard, Bruyeres-le-Chatel (FR); Shailendra Bansropun, Paris (FR)

(73) Assignee: Ecole Polytechnique (FR)

( * ) Notice: Subject to any disclaimer, the term of this patent is extended or adjusted under 35 U.S.C. 154(b) by 218 days.

(21) Appl. No.: 11/915,611

(22) PCT Filed: May 23, 2006

(86) PCT No.: PCT/EP2006/062550

§ 371 (c)(1),
(2), (4) Date: Nov. 27, 2007

(87) PCT Pub. No.: WO2006/125788

PCT Pub. Date: Nov. 30, 2006

(65) Prior Publication Data

US 2008/0210864 A1  Sep. 4, 2008

(30) Foreign Application Priority Data

May 27, 2005  (FR) .................................. 05 05394

(51) Int. Cl.
*G01Q 60/54* (2010.01)

(52) U.S. Cl. .............................. 850/48; 850/46; 850/47

(58) Field of Classification Search ................... 850/46, 850/47, 48
See application file for complete search history.

(56) References Cited

U.S. PATENT DOCUMENTS

| 5,356,510 | A | 10/1994 | Pribat et al. |
| 5,360,754 | A | 11/1994 | Pribat et al. |
| 2004/0165482 | A1* | 8/2004 | Kim ........................ 369/13.01 |
| 2005/0017171 | A1* | 1/2005 | Samuelson et al. .......... 250/306 |

FOREIGN PATENT DOCUMENTS

| EP | 0355241 | 2/1990 |
| RU | 2168237 | 5/2001 |
| WO | WO9512882 | 5/1995 |

OTHER PUBLICATIONS

International Search Report of Application No. PCT/EP2006/062550 mailed Jul. 12, 2006.

(Continued)

*Primary Examiner*—Jack I Berman
*Assistant Examiner*—Hanway Chang
(74) *Attorney, Agent, or Firm*—Lowe Hauptman Ham & Berner, LLP

(57) ABSTRACT

The invention is directed to a spin-polarized electron injector using a semiconductor tip, in which tip the injected electrons are photocreated by a circularly polarized light excitation incident on the rear of the tip. This tip is supported by a transparent lever or cantilever and undergoes a surface treatment for the purpose of removing the surface oxide layer, to prevent said layer from reforming and to improve the proportion of injected electrons.

8 Claims, 3 Drawing Sheets

OTHER PUBLICATIONS

Bode M: "Spin Polarized scanning tunnelling microscopy" Reports on Progress in Physics IOP Publishing UK, vol. 66, No. 4 published Mar. 14, 2003.

Grafstrom Stefan: "Photoassisted scanning tunneling microscopy" Journal of Applied Physics, American Institute of Physics, US, vol. 91, No. 4 publised Nov. 12, 2001.

Prins, M. W. J., R. Jansen and H. van Kempen, "Spin-polarized tunneling with GaAs tips in scanning tunneling microscopy", Physical Review B, vol. 53, No. 12, Mar. 15, 1996, pp. 8105-8113.

Nabhan, W., et al., "Effect of dichroism in the GaAs-tip-based spin polarized STM", Applied Surface Science 144-145 (1999) pp. 570-574.

Fowler, R. H. et al., "Electron Emission in Intense Electric Fields", Proc. Roy. Soc. London, 119, pp. 173-181, Mar. 21, 1928.

Gil-Lafton, E. et al., "Selective growth of GaAs by HVPE: keys for accurate control of the growth morphologies", Journal of Crystal Growth, 222 (2001), pp. 482-496.

Cambel, V. et al., "Formation of GaAs three-dimensional objects using AlAs "facet-forming" sacrificial layer and $H_3PO_4$, $H_2O_2$ based solution", Journal of Applied Physics, vol. 94, No. 7, Oct. 1, 2003, pp. 4643-4648.

* cited by examiner

LOCAL INJECTOR OF SPIN-POLARIZED ELECTRONS WITH SEMICONDUCTOR TIP UNDER LIGHT EXCITATION

CROSS-REFERENCE TO RELATED APPLICATIONS

The present Application is based on International Application No. PCT/EP2006/062550, filed on May 23, 2006, which in turn corresponds to France Application No. 0505394 filed on May 27, 2005, and priority is hereby claimed under 35USC §119 based on these applications. Each of these applications are hereby incorporated by reference in their entirety into the present application.

FIELD OF THE INVENTION

The present invention relates to a local spin-polarized electron injector using a semiconductor tip under light excitation.

Various methods based on the techniques of local probe microscopy have been developed for probing surface and thin-film magnetism on the nanoscale [see the review by M. Bode "*Spin-polarized scanning tunneling microscopy*", Rep. Prog. Phys. 66 523, (2003)].

BACKGROUND OF THE INVENTION

Near-field magnetooptic microscopy uses an optical probe. The results obtained hitherto show a resolution of a few hundred nanometers.

Magnetic force microscopy (MFM) is used to probe the leakage fields near the surface of a system exhibiting magnetic order. This technique, based on the measurement of the force induced by the leakage field on a magnetized tip, reveals (under certain conditions) the domain structure. This is currently the reference technique for domain imaging in thin magnetic films with an optimum resolution of a few tens of nanometers.

More recently, images of the magnetism on the atomic resolution have been obtained by spin-polarized tunnel microscopy (SPSTM) using a magnetic tip. This technique relies on the fact that, under suitable polarization conditions of the tunnel junction, the intensity of the tunnel current depends on the parallel or antiparallel configuration of the respective moments of the tip and of the surface.

The two techniques—magnetic tip SPSTM and MFM—mentioned above have opened up an enormous range of possible ways of studying magnetism on the nanoscale. However, these techniques suffer from a limitation due to the use of a magnetic tip that interacts with the surface under study and may significantly modify the local magnetic properties thereof.

One possible application of the electron injector is in the imaging of magnetism using a GaAs tip. Several years ago it was proposed to inject spin-polarized electrons generated by light excitation in a semiconductor tip. This idea is contained in the patent of Alvarado et al., "Spin Polarized Scanning Tunneling Microscope", European Patent 0 355 241, of 1990, one interesting aspect of which is described in FIG. 4. The electrons are spin-polarized if the light is circularly polarized ($\sigma^+$ or $\sigma^-$ helicity) and if the light energy, greater than the bandgap energy $E_g$ is furthermore less than the sum $E_g+\Delta$ where $\Delta$ is the spin-orbit interaction energy. For GaAs, the available energy window ranges from 1.42 eV to about 1.70 eV at ambient temperature. This operating mode has two advantages: firstly, the average spin of the injected electrons is controlled by the helicity of the light and changes sign when this helicity passes from $\sigma^+$ to $\sigma^-$. This makes it possible, by modulating the polarization of the light, to modulate the sign of the spin of the injected electrons. Thus, this is an independent measurement of the topography of the surface, by the average value of the contactless current, and the surface magnetism, by measuring the modulation of this current induced by the polarization modulation. Moreover, since the total magnetization of the photoelectrons is very low, the tip does not disturb the magnetism of the surface.

Owing to these advantages, several groups have attempted to apply this same idea, the light excitation taking place either from the side [see for example Prins et al. Phys. Rev. 53, 8105, (1996)], through the specimen, assumed to be transparent to the light. [W. Nabhan et al., Appl. Surf. Sci. 144-145, 570 (1999)]. The results obtained are not as convincing as those obtained with magnetic tips. In particular, strong parasitic effects, not associated with the magnetism, have been obtained. These effects mask the observation of the actual magnetic effects. These parasitic effects are attributed to the change in spin polarization during penetration of the light into the tip in the first case, and to the dichroism of the specimen in the second.

Another interesting related field is that of spin injection for spintronics and for quantum computing. The development of future components for spintronics and for quantum computing requires the injection of spin into semiconductor or metallic specimens, or into structures such as quantum dots. To achieve this injection without losing the spin, it is necessary to establish a barrier of controlled thickness between the injector and the system into which injection is to take place, which arrangement may be achieved more easily under tunnel injection conditions. Moreover, the injection into quantum dots requires the injector to be moved, which is why the tunnel imaging conditions are the most suitable.

Local probe techniques are envisioned for increasing the density of data storage. The company IBM has developed the "Millipede", which consists of a matrix of cantilevers allowing both writing and reading. Going on from the promising results obtained, several alternative forms of storage systems using local probe techniques have been proposed (heat-induced storage, ferroelectric storage, etc.), but no local probe storage system seems to dominate for the moment.

SUMMARY OF THE INVENTION

The subject of the present invention is a local spin-polarized electron injector having a semiconductor tip under light excitation that makes it possible for the spin polarization of the injected electrons to be easily changed and for the injection conditions to be optimized without inducing parasitic absorption of the excitation light, and which is easy to implement, with a comparable spatial resolution or one better than about 1 nanometer, this device giving access, jointly and in a simple manner, to topographic and magnetic information of the materials tested, without parasitic effects, and avoiding the abovementioned drawbacks of magnetic tips.

The local electron injector device according to the invention is an injector having a semiconductor tip fixed to a lever or cantilever and under light excitation, said device being characterized in that the light excitation is a circularly polarized light beam illuminating the opposite face of the cantilever to that on which the tip is formed and in that the cantilever is made of a material which is transparent at the wavelength of the light beam.

According to another feature of the invention, the tip is made to undergo a surface treatment for the purpose of removing a surface oxide layer, to prevent said layer reforming and to improve the proportion of injected electrons.

BRIEF DESCRIPTION OF THE DRAWINGS

The present invention will be more clearly understood on reading the detailed description of one embodiment, given by way of nonlimiting example and illustrated by the appended drawing in which:

FIGS. 3 and 4 are simplified diagrams showing two steps in the production of a local electron injector device according to the invention, FIG. 3 being a "rear" face view (from the face opposite to that on which the tip is formed), while FIG. 4 is a "front" face view.

DETAILED DESCRIPTION OF THE INVENTION

Figure 1:
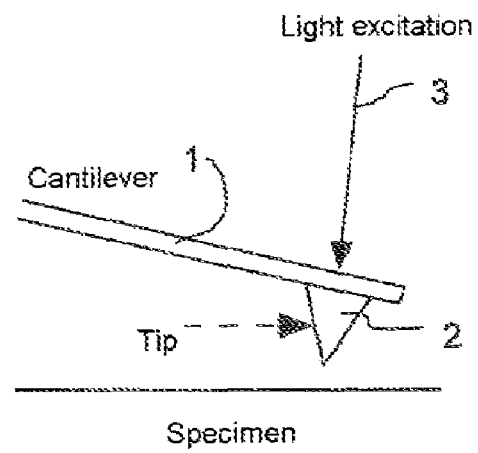
FIG. 1 is a simplified diagram of a device with a tip placed at the end of a cantilever according to the invention.
Figure 2:
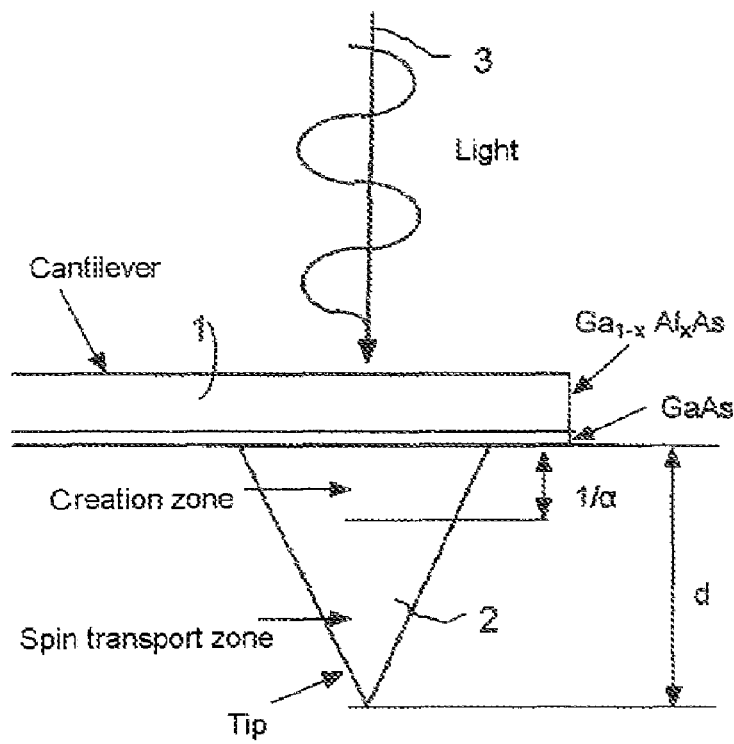
FIG. 2 is a partial and enlarged view of the device of FIG. 1, used to explain the process of creating and transporting spin-polarized electrons according to the invention.

FIG. 1 shows a cantilever (or lever) 1 at the end of which a tip 2 is formed. This cantilever is of the type of those used in AFM (atomic force microscopy). This geometry allows the tip to be excited by the light source. It also allows the tip/surface distance to be stabilized, by detecting, in a manner known per se, the laser light reflected by the cantilever using a quadrant diode and by measuring the deflection of the latter. The excitation light 3 illuminates the face of the cantilever 1 opposite to that on which the tip 2 is formed, substantially facing the tip. This light is a circularly polarized monochromatic light having for example a wavelength of between about 1.42 eV and 1.70 eV.

Advantageously, the cantilever is made of a material which is transparent at the wavelength of the exciting light and which does not modify its polarization. Thus, although in principle it is possible to choose a cantilever made of GaAs with a thickness less than or comparable to the depth of light absorption (of the order of one micron), it is possible, by choosing a transparent cantilever, to adjust its stiffness by adjusting its thickness, without inducing absorption light losses in the cantilever. One possible material is a $Ga_{1-x}Al_xAs$ semiconductor alloy on condition that a sufficiently large aluminum concentration x, greater than about 0.25-0.3, is chosen. This choice simplifies the epitaxial growth of the tip. It also makes it possible to limit the loss of electrons by recombination at the rear surface of the tip, since the $Ga_{1-x}Al_xAs/GaAs$ interface is known to induce very few surface recombination events. Finally, the brittleness of the cantilever is reduced, since the fracture strength of $Ga_{1-x}Al_xAs$ is greater than that of GaAs and may be comparable to that of silicon, which is used widely to fabricate AFM cantilevers. Another possible material is a semiconductor alloy of the GaAlInP type, which will facilitate the technological steps of selective stripping.

It is necessary to transport the electrons optically generated on the rear face of the tip right to the end of the latter, without a significant loss of spin polarization. To do this, the following condition must be met:

$1/\alpha \ll d \ll L_s$.

Here, $1/\alpha$ is the light absorption depth (of the order of one micron) in the tip at the wavelength of the light energy, d is the height of the tip and $L_s=(DT_1^*)^{1/2}$ is the spin diffusion length where $T_1^*=[\tau^{-1}+T^{-1}]^{-1}$. The time $T_1^*$ is the spin lifetime, taking into account recombination with a lifetime $\tau$ and spin relaxation with a time $T_1$. The left-hand part of the above condition indicates that the electrons are indeed created in the rear region of the tip, which makes it possible not to disturb the light field by the tip, and the surface of the specimen. The right-hand part indicates that the electrons diffuse right to the end of the tip and that their spin is preserved.

In p-type GaAs, having an acceptor concentration of a few $10^{18}$ cm$^{-3}$ it is possible for spin-polarized electrons to be photocreated (optically generated) at ambient temperature, which means that $T_1$ is large compared to $\tau$ and therefore that the spin is preserved over the lifetime of the electron. Furthermore, since in this material the spin diffusion length is of the order of 5 µm, the above condition is satisfied if the tip has a length of 2 to 3 µm. Contactless injection of photoelectrons into a metallic or semiconductor surface may take place by several mechanisms, the relative importance of which depends on the applied voltage: i) conventional tunnel mechanism; ii) high photoemission voltage above the tunnel barrier; iii) Fowler-Nordheim mechanism [R. H. Fowler and L. Nordheim, Proc. Roy. Soc. London, 119, 173, (1928)]. In the case of the latter mechanism, the injected photocurrent is increased by focusing the electric field lines, that is to say by choosing a more pointed tip.

The cantilever/tip assembly is produced by mainly combining epitaxy (particularly selective epitaxy) steps and deep etching. Epitaxy of the tip is carried out on a substrate having a special epitaxial structure on the surface (allowing the mechanical and optoelectronic properties of the cantilever to be controlled, as mentioned above in regard to the materials that can be used for the cantilever) and covered with a mask in which there are open holes (typically of micron size). By using selective epitaxy conditions, it is possible to grow material only from the open holes and therefore to localize the tips. Moreover, by modifying the selective epitaxy conditions, it is possible to choose the crystallographic planes that will delimit the tip and also their growth rates, thereby making it possible to control in way the geometry of the tip (especially its height and its radius of curvature at the end). The more open the angle of the tip, the lower the effect of surface recombination at the walls and therefore the easier it is for the spin-polarized electrons to be transported right to its ends. In contrast, a slender tip allows the spatial resolution to be improved. This therefore requires a compromise to be found in the value of the apex angle of the tip. The most suitable technique of this kind of growth is HVPE (vapor phase epitaxy using hydrides or chlorides) and it is possible for example by this technique to produce GaAs tips having a height and width of a few microns on an AlGaAs/GaAs substrate masked by silicon nitride or silica [E. Gil-Lafon, J. Napierala, D. Castelluci, A. Pimpinelli, R. Cadoret and B. Gerard, Crystal Growth, 222, 482, (2001)]. It is also possible to produce the tips by anisotropic chemical etching [V. Cambel, D. Gregusova and R. Kudela, J. Appl. Phys. 94, 4643, (2003)].

To produce the cantilever requires, on the one hand, the substrate material all around the cantilever to be removed, and therefore requires trenches to be able to be etched in the substrate with depths of several hundred microns. To facilitate this step, the initial thickness of the substrate may be limited (for example to 200 µm, which in the case of GaAs may be a good compromise between mechanical strength of the cantilever block and necessary etching time). The use of an anisotropic etching technique having high etching rates is preferable. The ICP (Inductively Coupled Plasma) technique is generally preferable to the other techniques that can be used, such as RIE (Reactive Ion Etching) or chemical etching. To produce the cantilever requires, on the one hand, its geometry and its mechanical properties to be controlled. This is carried out by lithography and by including, in the epitaxial structure deposited on the starting substrate, one or more chemical stop layers (i.e. exhibiting chemical etching selectivity relative to the materials constituting the cantilever), which allows the thickness of the cantilever produced to be controlled very precisely. For example, a GaInP stop layer may be incorporated into the structure between the GaAs substrate, which is removed, and the cantilever made of GaAlAs/GaAs.

Figure 3:
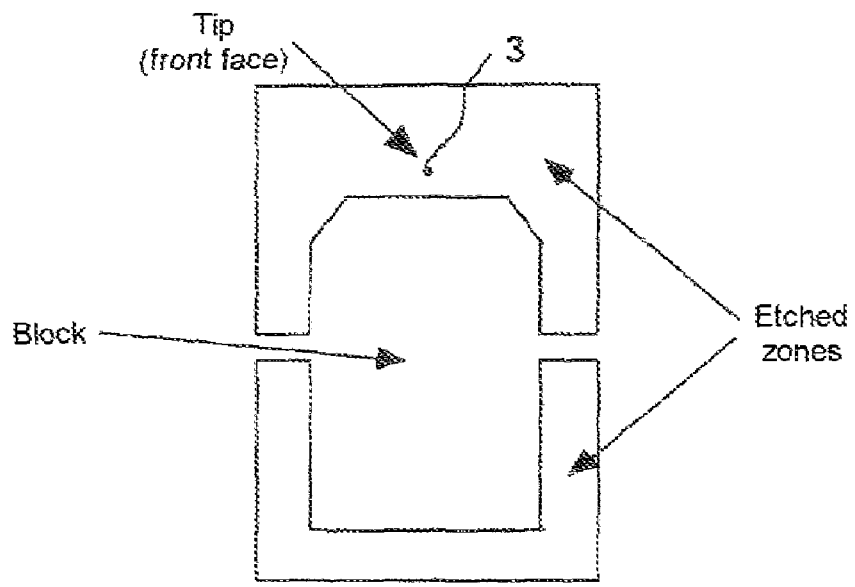
Figure 4:
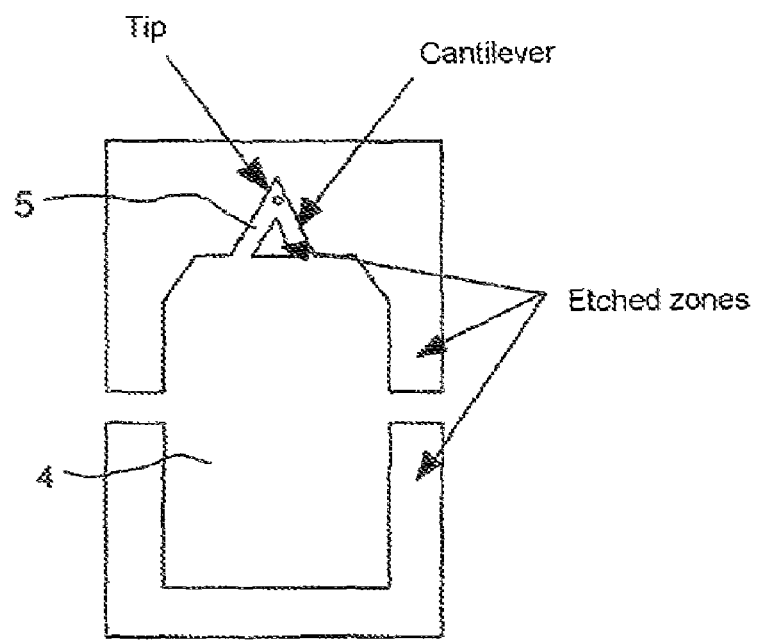

One example of the sequence of technological steps leading to the production of a GaAs tip/cantilever assembly is illustrated in FIGS. 3 and 4 and the following (these steps will make it possible to define a number of identical assemblies placed on a bulk GaAs wafer):

1) production of a GaAs/GaAlAs/GaInP epitaxial structure on a GaAs substrate of 200 μm thickness, on what will be called the front face. The thickness of the GaAlAs layer will be chosen to be between about 0.5 μm and a few microns, depending on the stiffness of the cantilever that it is desired to obtain. A tunnel injection experiment requires the stiffest cantilever possible, whereas an AFM experiment in contact mode requires a cantilever that is less stiff, and therefore thinner. The thickness of the GaInP layer will be the thickness usually chosen in etching processes with a stop layer;

2) deposition of a mask in the form of a silicon nitride layer on this epitaxial structure;

3) opening of holes in the silicon nitride layer in order to localize the subsequent growth of the tips (on the front face);

4) selective epitaxy of the tip 3 (or tips in the case in which several assemblies are formed on one and the same substrate);

5) deposition of silica on the front and rear faces of the substrate;

6) rear-face lithography to define the body 4 of the cantilever (5)/tip (3) block;

7) opening of the silica mask and ICP etching of the rear face of the GaAs substrate to a depth of 150 μm (see an example in FIG. 3, in which the tip 3 is viewed as if the substrate were transparent);

8) lithography of the front face to define the cantilever 5 (see an example in FIG. 4);

9) opening of the silica mask and ICP etching of the rear face of the GaAs substrate to a depth of 50 μm (the substrate is then entirely removed around the cantilever/tip block);

10) rear face etching by ICP or chemical etching (over about 50 μm) down to the GaInP stop layer;

11) selective chemical removal of the GaInP stop layer; and 12) removal of the silica masks.

What is thus obtained is a cantilever/tip assembly fixed to a GaAs block, which is itself connected by GaAs bridges to the rest of the GaAs wafer used. All that will be required is to break these bridges to detach the assembly, which can then be installed on the test apparatus (see FIG. 5). It should be noted that steps 2 to 4 and 5 to 7 respectively, or even steps 2 to 4 and 5 to 12 respectively, may be reversed.

Figure 5:
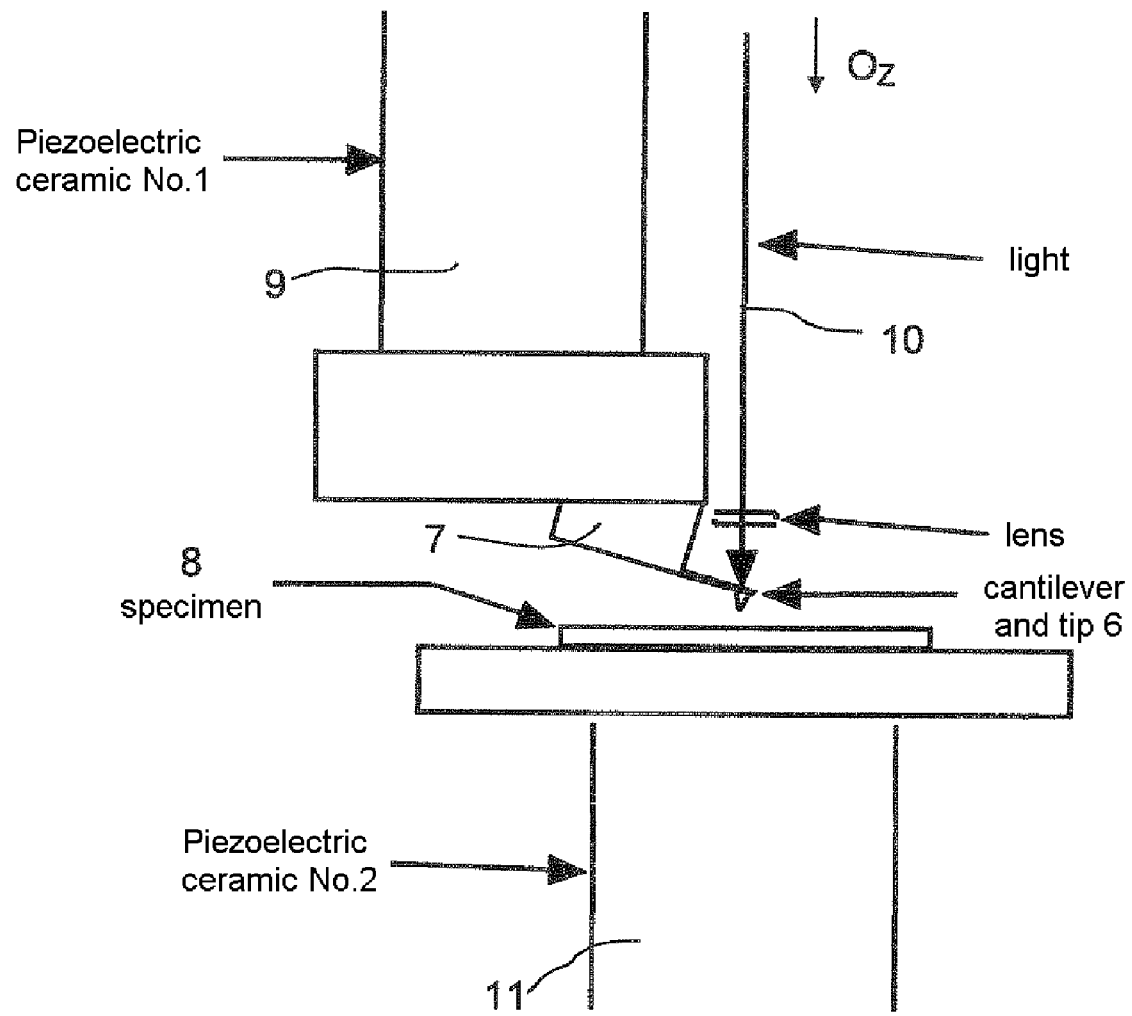
FIG. 5 is a simplified diagram of an experimental setup used for testing a local electron injector device according to the invention.

FIG. 5 shows a setup for testing the injection device thus produced. This setup in which the tip/cantilever assembly 6 is installed on a support 7, facing a specimen 8, must allow the light to be focused onto a surface of the specimen a few microns in diameter, at a point that does not move during the scanning of the surface of this specimen. This condition may be achieved using two piezoelectric ceramic actuators (see FIG. 5). The first ceramic 9 supports the cantilever and provides only a movement parallel to the light axis (Oz) of the coherent light beam 10 illuminating the rear face of the cantilever. In contrast, the second ceramic 11, to which the specimen 8 is fixed, allows movement in the two perpendicular directions Ox and Oy (in a plane perpendicular to the plane of the drawing), thereby allowing the specimen to be scanned. This setup is compatible with use in an ultrahigh vacuum, in air or in an inert gas, or in an electrochemical medium. To prevent oxidation of the tip during the experiment, a hydrophobic liquid, such as a polymer (for example polydimethyl siloxane) or a perfluorinated oil, may also be deposited on the specimen by spin coating.

According to another feature of the invention, the electron injection tip is treated. The treatment of the tip has two purposes. Firstly, it is necessary to remove the oxide layer that may prevent the appearance of a tunnel current. In addition, it is important to decrease recombination at the surface, which reduces the current of the electrons injected into the tip after their photocreation at the rear of the latter.

Several chemical treatments may be envisioned. For use in an ultrahigh vacuum, the tip may be treated with a sulfide solution (for example sodium sulfide or ammonium sulfide). Another possible treatment is that using a solution of hydrochloric acid in propanol, followed by introduction under vacuum in the absence of oxygen. A simple chemical technique allows a gaseous or liquid medium to be used, thereby greatly simplifying the measurements [V. L. Berkovits, T. V. L'vova and V. P. Ulin, "Procedure to obtain nitride films on surfaces of III-V semiconductors", Russian Federation patent 2 168 237 (2001)]. This process, which consists in immersing the tip in a hydrazine ($N_2H_4$)-based solution, makes it possible, after a possible moderate annealing under vacuum, to cover the tip with a very thin film of nitrogen, with a thickness of the order of a monolayer. It has been demonstrated that this technique reduces the rate of surface recombination and protects the surface from oxidation for at least several months.

The device of the invention makes it possible to carry out imaging of magnetic domains and of the surface topography of thin films, by minimizing magnetic injector/specimen interaction, and to do so in an ultrahigh vacuum, liquid or gaseous environment. It can also be employed for the study of spintronics in various materials by spin injection, or else for studying quantum structures and for high-density data storage.

The fact of using III-V alloys for the lever allows the thickness, and therefore the stiffness, of this lever to be adjusted without introducing light absorption. A more compliant lever is generally better suited to AFM conditions, whereas a stiffer lever allows better control of the tip-substrate distance, since this distance depends less on the forces between the two. The aim is to find the optimum value of this stiffness depending on the applications. The tip is therefore generally made of GaAs.

The invention claimed is:

1. A local spin-polarized electron injector, comprising:
   a semiconductor tip fixed to a cantilever and under light excitation, wherein the light excitation is a circularly polarized light beam illuminating an opposite face of the cantilever to that on which the tip is formed,
   wherein the tip is made to undergo a surface treatment for the purpose of removing a surface oxide layer, to prevent said layer from reforming and to improve the proportion of injected electrons.

2. The local electron injector as claimed in claim 1, wherein the geometric characteristics of the tip are such that the following condition is met: $1/\alpha \ll d \ll L_s$, $1/\alpha$ being the light absorption depth in the tip at the wavelength of the light energy, d the height of the tip and $L_s = (DT_1^*)^{1/2}$ the spin diffusion length, with $T_1^* = [\tau^{-1} + T_1^{-1}]^{-1}$, the time $T_1^*$ being the life time of the spin, taking into account recombination with a lifetime $\tau$ and spin relaxation with a time $T_1$.

3. The local electron injector as claimed in claim 1, wherein the cantilever is made of material which is transparent at the wavelength of the light beam.

4. The local electron injector as claimed in claim 1, wherein the lever is made of a III-V semiconductor alloy and the tip is made of GaAs.

5. A matrix of injectors as claimed in claim 1, allowing high-density data to be stored and read.

6. A local spin-polarized electron injector, comprising:

a semiconductor tip fixed to a cantilever and under light excitation, wherein the light excitation is a circularly polarized light beam illuminating an opposite face of the cantilever to that on which the tip is formed, wherein the geometric characteristics of the tip are such that the following condition is met: $1/\alpha \ll d \ll L_s$, $1/\alpha$ being the light absorption depth in the tip at the wavelength of the light energy, d the height of the tip and $L_s = (DT_1^*)^{1/2}$ the spin diffusion length, with $T_1^* = [\tau^{-1} + T_1^{-1}]^{-1}$, the time $T_1^*$ being the life time of the spin, taking into account recombination with a lifetime $\tau$ and spin relaxation with a time $T_1$.

7. The local electron injector as claimed in claim 6, wherein the cantilever is made of material which is transparent at the wavelength of the light beam.

8. The local electron injector as claimed in claim 6, wherein the cantilever is made of a III-V semiconductor alloy and the tip is made of GaAs.

* * * * *